United States Patent [19]

Terada et al.

[11] Patent Number: 5,948,826
[45] Date of Patent: Sep. 7, 1999

[54] HETEROGENEOUS ION EXCHANGE MEMBRANE AND PROCESS FOR ITS PRODUCTION

[75] Inventors: Ichiro Terada; Yoshiaki Higuchi; Haruhisa Miyake; Kazuo Umemura, all of Yokohama, Japan

[73] Assignee: Asahi Glass Company Ltd., Tokyo, Japan

[21] Appl. No.: 08/898,957

[22] Filed: Jul. 23, 1997

[30] Foreign Application Priority Data

Jul. 24, 1996 [JP] Japan .................................. 8-194196

[51] Int. Cl.⁶ ...................................................... C08J 5/22
[52] U.S. Cl. ............................... 521/27; 521/28; 525/232; 525/240
[58] Field of Search ........................ 521/27, 28; 525/232, 525/240

[56] References Cited

U.S. PATENT DOCUMENTS

| | | |
|---|---|---|
| 2,681,319 | 6/1954 | Bodamer .................................. 521/27 |
| 2,681,320 | 6/1954 | Bodamer .................................. 521/27 |
| 3,627,703 | 12/1971 | Kojima et al. . |
| 3,758,643 | 9/1973 | Fischer . |
| 4,167,551 | 9/1979 | Tamura et al. . |
| 5,346,924 | 9/1994 | Giuffrida . |

FOREIGN PATENT DOCUMENTS 94 06850   3/1994   WIPO .

*Primary Examiner*—Fred Zitomer
*Attorney, Agent, or Firm*—Oblon, Spivak, McClelland, Maier & Neustadt, P.C.

[57] ABSTRACT

A heterogeneous ion exchange membrane comprising an ion exchange resin and a binder polymer, wherein the binder polymer is a polymer containing at least a mixture comprising low density polyethylene and ethylene-propylene rubber or ethylene-propylene-diene rubber.

10 Claims, No Drawings

HETEROGENEOUS ION EXCHANGE MEMBRANE AND PROCESS FOR ITS PRODUCTION

The present invention relates to a heterogeneous ion exchange membrane, particularly an ion exchange membrane for adsorbing or permeation separating ions in an aqueous solution.

Ion exchange membranes have been reported in many literatures and patents. Styrene-divinylbenzene copolymer type homogeneous ion exchange membranes may be mentioned as the most practical and useful ones. In addition to their chemical resistance and heat resistance, these ion exchange membranes have a merit such that the ion exchange characteristics and the selective permeability can be controlled by changing the content of divinylbenzene as a crosslinking agent. Accordingly, they have been developed as various types of products synthesized for various applications. Especially in the field of concentrating seawater by electrodialysis relating to manufacture of common salt, membranes having low electrical resistance, a high transport number and a high level of function to selectively permeate monovalent ions, have been developed.

However, such styrene-divinylbenzene copolymer type ion exchange membranes are costly since they require cumbersome and highly sensitive process steps for polymerization and reaction. Further, it is difficult to control the heat thereby generated or the dimensional change, and there has been a drawback that the yield tends to be low, and the product tends to be expensive.

On the other hand, in the case of heterogeneous ion exchangers which are produced by mixing a pulverized ion exchange resin with a binder polymer, followed by heat extrusion or cast film-forming by means of a solvent, ion exchangers can be obtained inexpensively by a relatively simple process free from a polymerization or reaction step. Accordingly, many researches have been made thereon since about 1950.

For example, U.S. Pat. No. 3,627,703 and JP-B-47-24262 disclose a case wherein polypropylene is used as the binder polymer, U.S. Pat. No. 4,167,551, JP-B-52-3912, JP-B-53-18472 and JP-B-51-12313 disclose a case wherein a polyolefin such as polyethylene or polypropylene is used, U.S. Pat. Nos. 2,681,319 and 2,681,320 disclose a case wherein polyethylene, polyisobutylene, natural rubber, butyl rubber, polyisoprene, polychloroprene, styrene-butadiene rubber, nitrile rubber or a vinyl chloride-vinyl fatty acid ester copolymer, is used, and U.S. Pat. No. 5,346,924, WO94-06850 and Chinese Patent No. 1,044,411 disclose a case wherein linear low density polyethylene or high molecular weight high density polyethylene is used.

However, heterogeneous ion exchangers using these binders tend to lower electrical resistance, and if it is attempted to increase the content of ion exchange resins, there have been drawbacks such that in the case of a thermoplastic resin alone such as polyethylene or polypropylene, the strength tends to be low, or the membrane tends to be brittle, and in the case of a rubber such as natural rubber or butyl rubber, the resulting ion exchanger tends to be so soft that its handling tends to be difficult, and the surface tends to be rough so that when formed into a membrane, the product tends to have many pinholes. Further, the material is so soft that it is weak against deformation under pressure, and when it is assembled in the form of a membrane in an electrodialytic cell, if a pressure is exerted on one side thereof, it is likely to deform and pinholes are likely to be formed, whereby there has been a drawback that the liquid flowing in the cell is likely to leak to the low pressure side in a substantial amount.

As a means to solve such drawbacks, Chinese Patent Publication No. 1,044,411 discloses a case wherein a mixture comprising linear low density polyethylene, an ethylene-vinyl acetate copolymer as a flexible material and polyisobutene rubber, is used as a binder polymer. However, the ethylene-vinyl acetate copolymer is poor in chemical resistance and durability, and accordingly, such a method has had a drawback that it is hardly possible to obtain an ion exchange membrane having adequate properties durable for use for a long period of time.

The present invention has been made to solve the above-mentioned problems of the prior art and to provide a novel heterogeneous ion exchange membrane and a process for its production.

Namely, the present invention provides a heterogeneous ion exchange membrane comprising an ion exchange resin and a binder polymer, wherein the binder polymer is a polymer containing at least a mixture comprising low density polyethylene and ethylene-propylene rubber or ethylene-propylene-diene rubber.

Now, the present invention will be described in detail with reference to the preferred embodiments.

In the binder polymer to be used in the present invention, the content of the mixture comprising low density polyethylene and ethylene-propylene rubber or ethylene-propylene-diene rubber, is preferably at least 40 wt %. If the content is smaller than 40 wt %, the resulting film tends to be brittle, or the strength tends to be low, such being undesirable. The content is particularly preferably at least 60 wt %, whereby a product having a relatively high membrane strength can be obtained.

As the low density polyethylene constituting the binder polymer to be used in the present invention, preferred is one having a density of from 0.880 to 0.930 $g/cm^3$, particularly from 0.900 to 0.926 $g/cm^3$ and a melt flow rate, as an index for molecular weight, of from 3.0 to 30 g/10 min, as measured by JIS K6760. Here, the low density polyethylene includes linear low density polyethylene. Usual low density polyethylene and linear polyethylene may be used alone or in combination as a mixture. In the case of a mixture, it may be at any mixing ratio, so long as the physical properties of the mixture will be in the above ranges. On the other hand, as the ethylene-propylene rubber, preferred is one having a propylene content of from 25 to 50 wt % and a Mooney viscosity of from 35 to 50. As the ethylene-propylene-diene rubber, preferred is one having a propylene content of from 25 to 50 wt % and a Mooney viscosity of from 40 to 90.

With respect to physical properties of the mixture comprising low density polyethylene and ethylene-propylene rubber or ethylene-propylene-diene rubber, which will be used for the binder polymer in the present invention, preferred is a polymer having physical properties such as a surface hardness (Shore A) of from 80 to 97, preferably from 86 to 95, a tensile strength at break of at least 130 $kg/cm^2$, preferably 150 $kg/cm^2$, an elongation at break of from 700 to 900%, preferably from 750 to 850% and a Vicat softening point of from 75 to 130° C., preferably from 90 to 120° C. If the surface hardness is lower than 80, the resulting membrane tends to be soft, and the surface tends to be rough and weak against deformation under pressure, such being undesirable. If the surface hardness exceeds 97, the membrane will be strong against deformation under pressure, but it tends to be brittle, such being undesirable. If the tensile strength at break is less than 130 $kg/cm^2$, the strength of the resulting membrane also tends to be low, such being undesirable. If the elongation at break is less than 700%, the membrane is likely to break, and if it exceeds 900%, the resulting membrane tends to be soft, such being undesirable. If the Vicat softening point is lower than 75° C., the membrane is likely to undergo thermal deformation during its use, and if it exceeds 130° C., the temperature for the film-forming operation becomes high, whereby ion exchange groups of the ion exchange resin tend to be decomposed, such being undesirable.

To attain the above-mentioned physical properties, the content of ethylene-propylene rubber or ethylene-propylene-diene rubber in the mixture comprising low density polyethylene and ethylene-propylene rubber or ethylene-propylene-diene rubber, is preferably from 10 to 50 wt %. If the content of rubber is less than 10 wt %, the resulting membrane tends to be brittle, and if it exceeds 50 wt %, the membrane tends to be soft and weak against deformation under pressure, such being undesirable. Particularly preferred is one wherein the content of rubber is from 25 to 35 wt %, since it is thereby possible to obtain a product excellent in the above-mentioned physical properties, and forming of a membrane will thereby be easy.

In a case where other polymers are mixed to the mixture comprising low density polyethylene and ethylene-propylene rubber or ethylene-propylene-diene rubber as the binder polymer, such other polymers may preferably be polyhydrocarbon olefins such as high density polyethylene, ultrahigh molecular weight high density polyethylene, polypropylene and polyisobutylene.

The ion exchange resin to be used in the present invention may, for example, be a strongly acidic cation exchange resin, a strongly basic anion exchange rein or an amphoteric ion exchange resin. These resins may be used alone or in combination as a mixture. Particularly preferred is a cation exchange resin having sulfonic acid groups introduced to a styrene-divinylbenzene copolymer, or an anion exchange resin having quaternary ammonium groups introduced thereto. With respect to the mixing ratio of the ion exchange resin particles and the binder polymer, the weight ratio of the ion exchange resin/the binder polymer is preferably from 40/60 to 70/30, more preferably from 50/50 to 60/40. If the ion exchange resin is less than 40 wt %, the electrical resistance of the resulting heterogeneous ion exchange membrane tends to be remarkable high, such being undesirable. If the ion exchange resin exceeds 70 wt %, the mechanical strength tends to be so low that it tends to be difficult to form a membrane. In the present invention, in addition to the ion exchange resin and the binder polymer, other substances, for example, a lubricant such as glycerol, may be added in an amount of from 5 to 10 wt %, as the case requires.

The ion exchange capacity of the ion exchange resin is preferably from 1.0 to 5.0 meq/g dry resin, more preferably from 3.0 to 4.8 meq/g dry resin. With respect to the particle size of the ion exchange resin particles, it is preferred that the maximum particle size is at most 150 $\mu$m, and particles having particle sizes of from 100 to 150 $\mu$m constitute at most 5 wt %, based on the entire material of ion exchange resin particles, and particles having particle sizes of at most 20 $\mu$m constitute at most 20 wt %. If the maximum particle size exceeds 150 $\mu$m, or if particles having particle sizes of from 100 to 150 $\mu$m, constitute more than 5 wt %, pinholes are likely to be formed when a heterogeneous ion exchange membrane is formed, and the mechanical strength of the membrane tends to be low, such being undesirable. If ion exchange resin particles having particle sizes of at most 20 $\mu$m exceeds 20 wt %, the surface area of the ion exchange resin particles increases too much, whereby kneading with the binder polymer tends to be inadequate, and defects are likely to form, such being undesirable. Further, if heat kneading is carried out sufficiently to eliminate defects, it takes time, ion exchange groups are likely to be decomposed as the kneading temperature increases, or the electrical resistance of the membrane tends to increase substantially, such being undesirable.

The heterogeneous ion exchange membrane of the present invention is prepared by a process which comprises preparing a mixture of solid particles comprising the above-mentioned ion exchange resin and a binder polymer which is a polymer containing the mixture of low density polyethylene and ethylene-propylene rubber or ethylene-propylene-diene rubber, melt-molding the mixture of solid particles to form a membrane product.

The proportions of the ion exchange resin and the binder polymer to be used for the above process, are as described above. Mixing of low density polyethylene and rubber to form the binder polymer, and mixing of the binder polymer with the ion exchange resin, are preferably carried out to obtain the respective mixtures as uniform as possible. In some cases, these mixtures may be melt-molded to obtain pellets having a diameter of from 2 to 6 mm.

It is preferable to control a water content of the ion exchange resin to be not more than 3 wt % before mixing. If the water content of the ion exchange resin exceeds 3 wt %, the uniformity of the mixture tends to be insufficient, such being undesirable. When pellets are employed, it is preferable to control a water content of the pellets to be not more than 1 wt % before forming a membrane. If the water content of the pellets exceeds 1 wt %, the surface of the membrane product tends to be rough, such being undesirable.

The mixture of the ion exchange resin and the binder polymer is, preferably after being mixed uniformly, subjected to melt-molding at a temperature of from 130 to 300° C., preferably from 150 to 250° C. For the melt-molding, extrusion molding is preferably employed. The molded membrane product may, for example, be in the form of a film having a thickness of 400 to 600 $\mu$m, a hollow fiber having an inner diameter of from 300 to 1,200 $\mu$m and a thickness of from 300 to 500 $\mu$m, or a cylinder having a diameter of from 5 to 50 mm and a thickness of from 400 to 600 $\mu$m.

The membrane product is preferably dipped in an aqueous solution after forming, whereby electric resistance will be decreased. In this dipping process, an aqueous solution includes water. It is preferable to use deionized water as an aqueous solution.

The membrane product is dipped preferably in deionized water at a temperature of from 40 to 90° C. for from 0.5 to 72 hours.

The ion exchange membrane of the present invention can be used as an ion exchange membrane useful for electrodialysis for e.g. concentrating seawater, demineralizing water, concentrating and recovering acids or recovering valuable metals, or for diffusion dialysis for e.g. recovering acids, or for a separator for e.g. secondary cells. It is particularly useful for production of industrial water and drinking water by electrodialytic demineralization of water or for production of pure water by self regeneration type electrodialysis, wherein an ion exchange resin and an ion exchange membrane are used in combination to produce pure water.

Now, the present invention will be described in further detail with reference to Examples. However, it should be understood that the present invention is by no means restricted to such specific Examples.

EXAMPLE 1

As a binder polymer, 70 wt % of low density polyethylene and 30 wt % of ethylene-propylene-diene rubber were mixed and kneaded in a laboplastomill at 150° C. for 30 minutes to obtain a mixture. The physical properties of the mixture were such that the surface hardness (Shore A) was 95, the tensile strength at break was 170 kg/cm$^2$, the elongation at break was 780%, and the Vicat softening point was 105° C.

On the other hand, as an ion exchange resin, Diaion SK-1B (styrene-divinylbenzene copolymer resin, ion exchange groups: —SO$_3$Na type, apparent density: 0.825 g/ml, water content; 43 to 50 wt %, ion exchange capacity; 2.0 meq/me) manufactured by Mitsubishi Chemical Corporation being a strongly acidic cation exchange resin, was used, and the resin was dried in a hot air at 60° C. for 24 hours and then pulverized by a jet mill. The pulverized particles were sieved by a stainless steel mesh to remove particles having particle sizes exceeding 150 μm. The particle size distribution of the obtained powder particles of ion exchange resin having particle size of at most 150 μm was measured by sieving, whereby particles having particle sizes of from 100 to 150 μm were 1.2 wt %, and particles having particle sizes of at most 20 μm were 12 wt %. Such ion exchange resin particles and the above-mentioned low density polyethylene/ethylene-propylene-diene rubber mixture were mixed in a mixing ratio of 60/40 (weight ratio) and kneaded in a laboplastomill at 130° C. at 50 rpm for 20 minutes. The obtained kneaded product was subjected to hot melt pressing by a flat plate press at 160° C. to obtain a cation exchange membrane having a thickness of 500 μm.

The obtained membrane was dipped in deionized water at 50° C. for 2 days, whereupon the electrical resistance of the membrane was measured at an alternate current of 1,000 Hz in a 0.5N sodium chloride aqueous solution, whereby the resistivity was 550 Ω·cm. Further, the tensile strength at break of the membrane was 2.8 MPa, the elongation at break was 160%, and the bursting strength was 0.15 MPa. Further, the permeability of water was measured by putting water on one side of the membrane to exert a pressure of 0.35 kg/cm$^2$, whereby the water permeation rate was as low as 10 ml/h·m$^2$, and deformation of the membrane against pressure was little.

EXAMPLE 2

An anion exchange membrane having a thickness of 500 μm was prepared in the same manner as in Example 1 except that as the ion exchange resin, Diaion SA-10A (styrene-divinylbenzene copolymer resin, ion exchange groups: —N(CH$_3$)$_3$Cl type, apparent density: 0.685 g/ml, water content: 43 to 47 wt %, ion exchange capacity: 1.3 meq/ml) manufactured by Mitsubishi Chemical Corporation being a strongly basic anion exchange resin, was used. The particle size distribution of particles of the ion exchange resin powder having particle sizes of at most 150 μm, was such that particles having particle sizes of from 100 to 150 μm were 0.9 wt %, and particles having particle sizes of at most 20 μm were 8 wt %. The obtained membrane was dipped in deionized water at 50° for 2 days, whereupon the electrical resistance of the membrane was measured at an alternate current of 1,000 Hz in a 0.5N sodium chloride aqueous solution, whereby the resistivity was 300 Ω·cm. Further, the strength at break of this membrane was 2.5 MPa, the elongation at break was 150%, and the bursting strength was 0.13 MPa. Further, the permeability of water was measured by putting water on one side of the membrane to exert a pressure of 0.35 kg/cm$^2$, whereby the water permeation rate was as low as 30 ml/h·m$^2$, and deformation of the membrane against pressure was little.

EXAMPLE 3

As a binder polymer, 50 wt % of low density polyethylene and 20 wt % of a copolymer of ethylene with hexene-1 (Mitsubishi Polyethy C6-SF240, tradename, manufactured by Mitsubishi Chemical Corporation) and 30 wt % of ethylene-propylene-diene rubber were mixed and kneaded in a laboplastomill at 150° C. for 30 minutes to obtain a mixture. The physical properties of the mixture was such that the surface hardness (Shore A) was 93, the tensile strength at break was 180 kg/cm$^2$, the elongation at break was 800%, and the Vicat softening point was 98° C.

A cation exchange membrane having a thickness of 500 μm was prepared in the same manner as in Example 1 except that the above polymer was used as the binder polymer. The obtained membrane was dipped in deionized water at 50° C. for 2 days, whereupon the electrical resistance of the membrane was measured at an alternate current of 1,000 Hz in a 0.5N sodium chloride aqueous solution, whereby the resistivity was 480 Ω·cm. Further, the strength at break of this membrane was 2.5 MPa, the elongation at break was 130%, and the bursting strength was 0.12 MPa. Further, the permeability of water was measured by putting water on one side of the membrane to exert a pressure of 0.35 kg/cm$^2$, whereby the water permeation rate was as low as 18 ml/h·m$^2$, and deformation of the membrane against pressure was little.

EXAMPLE 4

As a binder polymer, 30 wt % of low density polyethylene, 35 wt % of an ethylene/4-methylpetene-1 copolymer (Ultozex 2020L, tradename, manufactured by Mitsui Petrochemical Co., Ltd.) and 35 wt % of ethylene-propylene-diene rubber were mixed and kneaded in a laboplastomill at 150° C. for 30 minutes to obtain a mixture. The physical properties of the mixture were such that the surface hardness (Shore A) was 90, the tensile strength at break was 160 kg/cm$^2$, the elongation at break was 850%, and the Vicat softening point was 90° C.

An anion exchange membrane having a thickness of 500 μm was prepared in the same manner as in Example 2 except that the above polymer was used as the binder polymer. The obtained membrane was dipped in deionized water at 50° C. for 2 days, whereupon the electrical resistance of the membrane was measured at an alternate current of 1,000 Hz in a 0.5N sodium chloride aqueous solution, whereby the resistivity was 250 Ω·cm. Further, the strength at break of this membrane was 2.0 MPa, the elongation at break was 120%, and the bursting strength was 0.12 MPa. Further, the permeability of water was measured by putting water on one side of the membrane to exert a pressure of 0.35 kg/cm$^2$, whereby the water permeation rate was as low as 60 ml/h·m$^2$, and deformation of the membrane against pressure was little.

EXAMPLE 5

A cation exchange membrane having a thickness of 500 μm was prepared in the same manner as in Example 1 except that to the low density polyethylene/ethylene-propylene-diene rubber mixture obtained in Example 1, high density polyethylene (Mitsubishi Polyethy HD-HJ290, tradename, manufactured by Mitsubishi Chemical Corporation) was mixed in a weight ratio of 75/25, and the mixture was used as the binder polymer. The obtained membrane was dipped in deionized water at 50° C. for 2 days, whereupon the electrical resistance of the membrane was measured at an alternate current of 1,000 Hz in a 0.5N sodium chloride aqueous solution, whereby the resistivity was 400 Ω·cm. Further, the strength at break of this membrane was 2.0 MPa, the elongation at break was 120%, and the bursting strength was 0.12 MPa. Further, the permeability of water was measured by putting water on one side of the membrane to exert a pressure of 0.35 kg/cm$^2$, whereby the water permeation rate was as low as 80 ml/h·m$^2$, and deformation of the membrane against pressure was little.

COMPARATIVE EXAMPLE 1

A cation exchange membrane having a thickness of 500 μm was prepared in the same manner as in Example 1 except that in Example 1, the ethylene-hexene-1 copolymer (Mitsubishi Polyethy C6-SF240, tradename, manufactured by Mitsubishi Chemical Corporation) was used as the binder polymer. The obtained membrane was dipped in deionized water at 50° C. for 2 days, whereupon the electrical resistance of the membrane was measured at an alternate current of 1,000 Hz in a 0.5N sodium chloride aqueous solution, whereby the resistivity was as low as 350 Ω·cm, but the strength at break of this membrane was 1.3 MPa, the elongation at break was 70%, and the bursting strength was 0.08 MPa, and thus the strength was poor. Further, the permeability of water was measured by putting water on one side of the membrane to exert a pressure of 0.35 kg/cm$^2$, whereby the water permeation rate was as high as 500 ml/h·m$^2$, and deformation of the membrane against pressure was substantial.

COMPARATIVE EXAMPLE 2

An anion exchange membrane having a thickness of 500 μm was prepared in the same manner as in Example 2 except that the low density polyethylene/ethylene-propylenediene rubber mixture obtained in Example 1 and high density polyethylene (Mitsubishi Polyethy HD-HJ290, tradename, manufactured by Mitsubishi Chemical Corporation) were mixed in a weight ratio of 25/75, and the mixture was used as a binder polymer, and the mixing conditions of the anion exchange resin powder particles and the above binder polymer were changed to 160° C., 50 rpm and 20 minutes. The obtained membrane was dipped in deionized water at 50° C. for 2 days, whereupon the electrical resistance of the membrane was measured at an alternate current of 1,000 Hz in a 0.5N sodium chloride aqueous solution, whereby the resistivity was as high as 1,000 Ω·cm. Further, the strength at break of this membrane was 1.0 MPa, the elongation at break was 60%, and the bursting strength was 0.07 MPa, and thus the strength was low. Further, the permeability of water was measured by putting water on one side of the membrane to exert a pressure of 0.35 kg/cm$^2$, whereby the water permeation rate was as high as 2,500 ml/h·m$^2$, and deformation of the membrane against pressure was large.

As described in the foregoing, the improved heterogeneous ion exchange membrane of the present invention is not only inexpensive but also has merits such that the electrical resistance is relatively low and the mechanical strength is high.

What is claimed is:

1. A heterogeneous ion exchange membrane comprising an ion exchange resin and a polymeric binder, wherein the binder is a mixture comprising low density polyethylene and from 10 to 50 wt % of rubber, wherein the rubber is at least one selected from the group consisting of ethylene-propylene rubber and ethylene-propylene-diene rubber.

2. The heterogeneous ion exchange membrane according to claim 1, wherein the binder polymer is a polymer containing at least 40 wt %, based on the binder polymer, of said mixture.

3. The heterogeneous ion exchange membrane according to claim 1, wherein the mixture comprising low density polyethylene and rubber is a polymer having physical properties of a surface hardness (Shore A) of from 80 to 97, a tensile strength at break of at least 130 kg/cm$^2$, an elongation at break of from 700 to 900% and a Vicat softening point of from 75 to 130° C.

4. The heterogeneous ion exchange membrane according to claim 1, wherein the mixing ratio of the ion exchange resin/the binder polymer is from 40/60 to 70/30 (weight ratio).

5. The heterogeneous ion exchange membrane according to claim 1, wherein the ion exchange resin is a strongly acidic cation exchange resin, a strongly basic anion exchange resin, an amphoteric ion exchange resin or a mixture thereof.

6. The heterogeneous ion exchange membrane according to claim 1, wherein the heterogeneous ion exchange membrane is in the form of a hollow fiber.

7. A process for producing a heterogeneous ion exchange membrane, which comprises preparing a mixture of solid particles comprising an ion exchange resin and a polymeric binder wherein the binder is a mixture comprising low density polyethylene and from 10 to 50 wt % of rubber, wherein the rubber is at least one selected from the group consisting of ethylene-propylene rubber and ethylene-propylene-diene rubber, melt-molding the mixture of solid particles to obtain a membrane product.

8. The process according to claim 7, wherein the mixture of solid particles is melt-molded at a temperature of from 130 to 300° C.

9. The process according to claim 7, further comprises dip-treating the membrane product in an aqueous solution.

10. The process according to claim 9, wherein the aqueous solution is deionized water.

* * * * *